United States Patent [19]

Maier

[11] Patent Number: 4,735,445

[45] Date of Patent: Apr. 5, 1988

[54] FLANGE CONNECTION

[75] Inventor: Hans P. Maier, VS-Schwenningen, Fed. Rep. of Germany

[73] Assignee: Agintec AG, Pfaffikon, Switzerland

[21] Appl. No.: 896,646

[22] Filed: Aug. 15, 1986

[30] Foreign Application Priority Data

Aug. 31, 1985 [DE] Fed. Rep. of Germany ....... 3531191
Feb. 13, 1986 [DE] Fed. Rep. of Germany ....... 3604467

[51] Int. Cl.$^4$ ..................... F16L 19/08; F16L 21/06
[52] U.S. Cl. .................................. 285/341; 285/364; 285/414; 285/910
[58] Field of Search ............... 285/341, 363, 364, 368, 285/414, 910, 340

[56] References Cited

U.S. PATENT DOCUMENTS

| 813,454 | 2/1906 | Schaad | 285/363 X |
| 2,191,044 | 2/1940 | Seligman | 285/910 X |
| 2,900,199 | 8/1959 | Logan | 285/363 X |
| 3,189,371 | 6/1965 | Swan | 285/341 X |
| 4,480,861 | 11/1984 | Cann | 285/414 X |

FOREIGN PATENT DOCUMENTS 3206590 7/1983 Fed. Rep. of Germany ...... 285/340
6891 of 1887 United Kingdom ................ 285/910

Primary Examiner—Randolph A. Reese
Assistant Examiner—Anthony Knight
Attorney, Agent, or Firm—Schwartz, Jeffery, Schwaab, Mack, Blumenthal & Evans

[57] ABSTRACT

The invention relates to a flange connection for two components, in particular for containers, pipes or the like, with each of the two components having a flange which can be fastened against one another by fastening means and enclose between them a sealing body gripping over the connecting joint between the two components. Each flange, in its end face facing toward the connecting joint, has an annular sealing chamber which widens conically toward the connecting joint and into which a sealing body of annular configuration is positioned. The flanges, when fastened, bear against one another at the end face and together form a sealing chamber which is approximately triangular in cross-section and is virtually completely filled by the sealing body deformed by the fastening.

7 Claims, 3 Drawing Sheets

Fig.2a
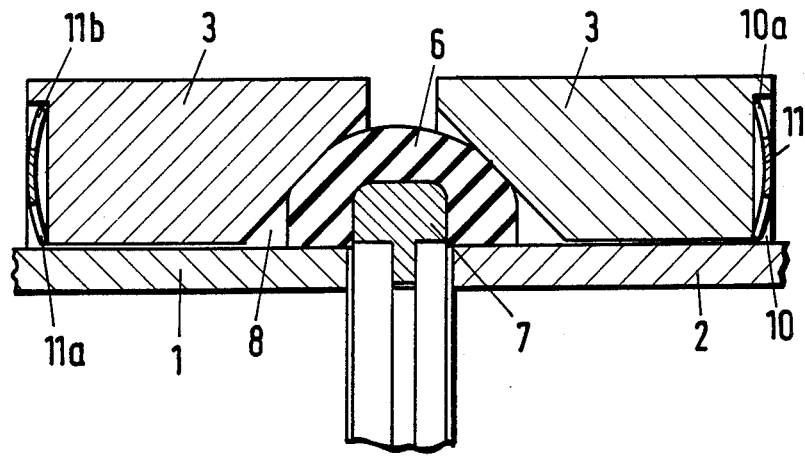
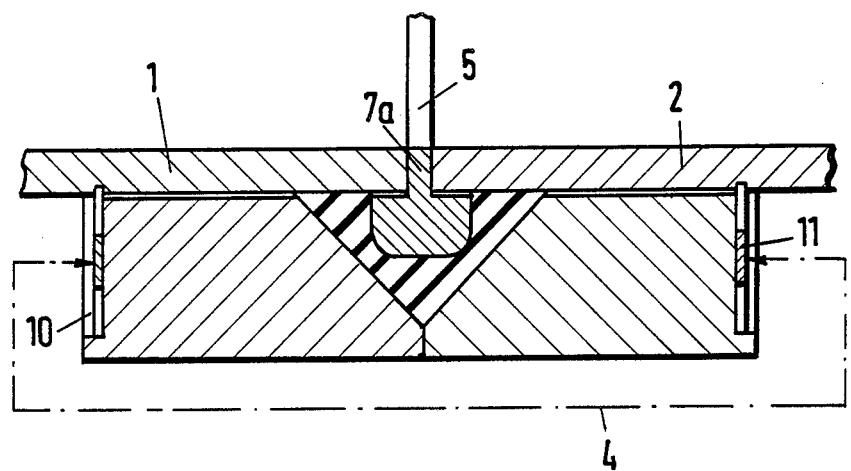
Fig.2b

FLANGE CONNECTION

BACKGROUND OF THE INVENTION

The invention relates to a flange connection for two components, in particular for containers, pipes or the like, with each of the two components having a flange which can be fastened against one another by fastening means and enclose between them a sealing body gripping over the connecting joint between the two components.

Containers, apparatus, pipelines and the like are mostly sealed on the basis of the flat seal principle and fastened by rounded and butt-welded flange rings. This type of sealing and connection is mechanically complicated and accordingly expensive and requires very high forces for constructing the sealing function via the flat seal, which forces in turn necessitate large flange ring cross-sections and also a large number of fastening elements.

SUMMARY OF THE INVENTION

The object of the invention is to design the flange connection which is simple in construction and provides a superior sealing function.

This object is achieved according to the invention in that each flange, in its end face facing toward the connecting joint, has an annular sealing chamber which widens conically toward the connecting joint and into which the sealing body of annular configuration is contained at the end face, with the flanges, having been fastened, bearing against one another at the end face and together forming a sealing chamber which is approximately triangular in cross-section and is virtually completely filled by the sealing body deformed by the fastening.

The flange connection according to the invention is particular suitable for containers, apparatus and pipelines having a larger nominal diameter. The cross-sections for the flange profiles can be of a smaller size and accordingly lighter. The number of fastening means can be reduced, in which case segmental clamping screws, for example, can be used as the fastening means, which segmental clamping screws are commercially available and offered by the company Walter G. Rathmann.

The sealing body preferably consists of an elastomeric ring which has an inwardly open annular groove into which an inner ring is embedded which preferably sits loosely in the elastomeric ring and can have an inner annular collar which projects as a stop between the two components.

As a result of the conical design of the sealing chambers, a pressure is exerted on the sealing body in the axial and radial direction when the two flanges are pressed against one another. Since the inner ring in each case rests loosely in the annular groove of the elastomeric ring, the working pressure of the medium intensifies the sealing effect of the elastomeric ring.

It is expedient, in particular for connecting components of larger nominal diameter, if the flanges are portions of endless profiled material which are bent round, and also the elastomeric ring as well as the inner ring in each case represent portions of endless profiled strips.

In the new flange connection, it is possible for the two flanges to be welded to the component allocated in each case. It is advantageous in this embodiment that the welds are not tight but only need to absorb connecting forces.

However, it is also possible in the connecting principle according to the invention for each flange to be pushed loosely onto the allocated component and, in its end face facing away from the sealing chamber, to have a clamping chamber into which at least one annular clamping element is pushed. The clamping element is supported on the component with a radially inwardly located clamping edge, is gripped over by a clamping surface of the clamping chamber with respect to its radially outwardly located clamping edge, and projects out of the clamping chamber in the axial direction in such a way that a compressive force applied by the fastening means and acting axially on the clamping element leads to an increase in the outside diameter and a decrease in the inside diameter of the clamping element.

The abovementioned annular clamping element can be made up of individual annular segments.

The abovementioned inner annular collar of the inner ring is preferably not provided in the case of large and therefore heavy components. The inner ring is then made without stop.

Further embodiments of the invention are described in greater detail below, together with further advantages of the invention with reference to exemplary embodiments.

BRIEF DESCRIPTION OF THE DRAWINGS

Some exemplary embodiments of the invention which serve as examples are shown in the application drawings, in which:

FIG. 2a is a longitudinal sectional view similar to FIG. 1a, showing a modified embodiment of the invention, and wherein the flanges are not connected;

FIG. 2b is a view similar to FIG. 2a, showing the flanges connected;

DETAILED DESCRIPTION OF THE PREFERRED EMBODIMENTS

Figure 1A:
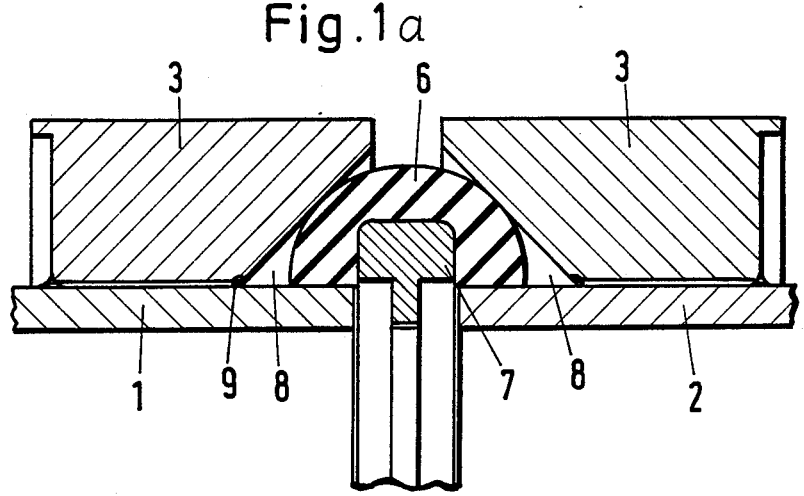
FIG. 1a shows a welded flange connection in longitudinal section, before fastening of the flanges.

The flange connections shown in FIGS. 1a, 1b, 2a and 2b for two components 1 and 2 have in each instance two flanges 3 which are fastened against one another by fastening means 4. These fastening means are in each case indicated only by a chain-dotted line in FIGS. 1b and 2b, and can advantageously be segmental clamping screws. The two flanges 3 enclose between them a sealing body which grips over the connecting joint 5 between the two components 1 and 2 and consists of an elastomeric ring 6 which has an inwardly open annular groove into which an inner ring 7 is embedded. The latter has an inner, annular collar 7a which projects as a stop between the two components 1 and 2.

Each flange 3, in its end face facing toward the connecting joint 5, has an annular sealing chamber 8 which widens conically toward the connecting joint and into which the sealing body 6 and 7 is positioned. It can be seen from FIGS. 1b and 2b that, after the two flanges are fastened, they bear against one another at the end face and together form a sealing chamber which is approximately triangular in cross-section and is virtually completely filled by the sealing body 6 and 7, deformed by the fastening operation.

Figure 1B:
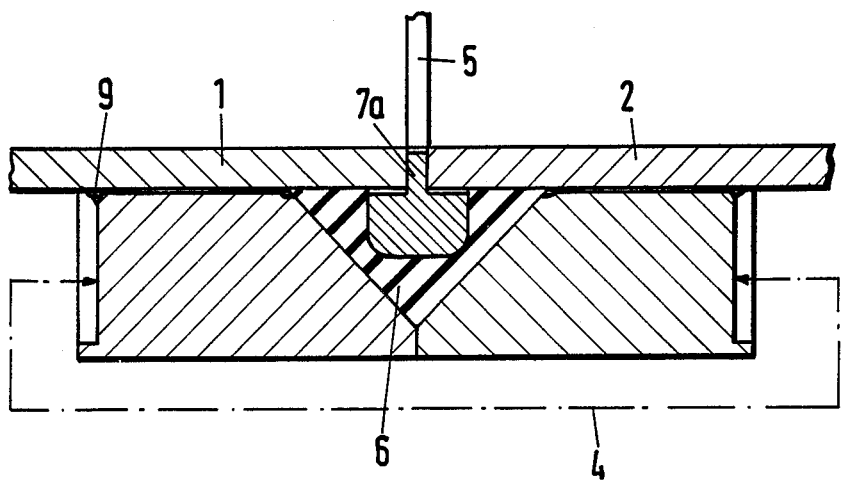
FIG. 1b is a view similar to FIG. 1a, with the flanges being shown in their fastened position.

In the flange connection according to FIGS. 1a and 1b, the two flanges 3 are welded to the associated components 1 and 2, with it not being necessary for the welds 9 to be tight, because they merely absorb connecting forces.

In the embodiment shown in FIGS. 2a and 2b, each flange 3 is pushed loosely onto the associated components 1 and 2, respectively and, the end face of each flange facing away from the sealing chamber 8 has a clamping chamber 10 into which at least one annular clamping element 11 is positioned. The latter is supported on the components 1 and 2, respectively, with a radially inwardly lying clamping edge 11a and, with respect to its radially outwardly lying clamping edge 11b, is gripped over by a clamping surface 10a of the clamping chamber 10. It can further be seen from FIG. 2a that the clamping element 11 projects out of the clamping chamber 10 in the axial direction in such a way that a compressive force applied by the fastening means 4 and acting axially on the clamping element 11 leads to an increase in the outside diameter and a decrease in the inside diameter of the clamping element 11. When the fastening means 4 are tightened, the annular clamping elements 11 are pressed against the rear of the respective clamping chamber 10, with the inner clamping edge 11a pressing slightly into the circumference of the components 1 and 2, respectively (see FIG. 2b).

Figure 4:
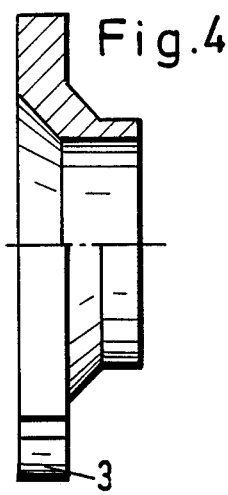
FIG. 4 shows the flange according to FIG. 3 in cross-section and side view.
Figure 3:
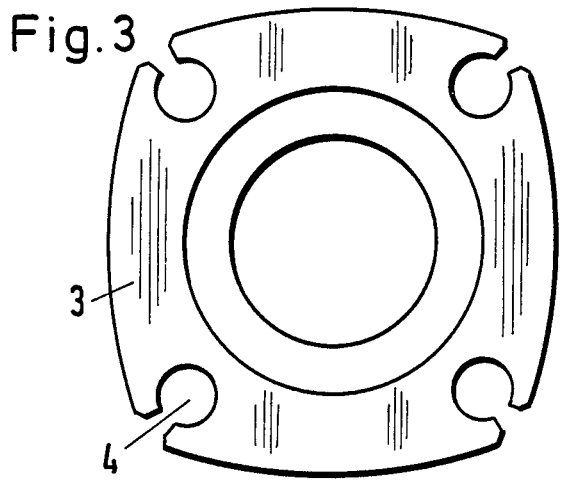
FIG. 3 shows a modified embodiment of a mount-on welded flange in plan view.

FIGS. 3 and 4 show a modified embodiment for a mount-on welded flange. The fastening means 4 fastening these flanges 3 against one another can be formed by a normal bolted flange connection.

Figure 6:
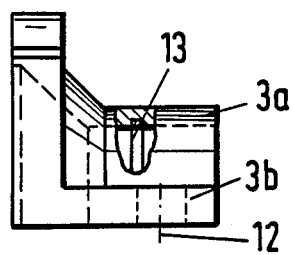
FIG. 6 sohws the flange segment according to FIG. 5 in side view and partly in cross-section.
Figure 5:
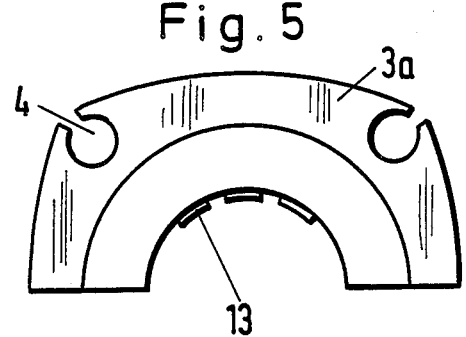
FIG. 5 is an end view of the flange embodiment shown in FIG. 6.
Figure 7:
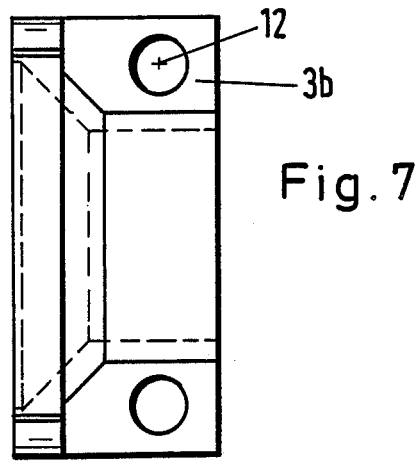
FIG. 7 is an end view of the flange segment according to FIGS. 5 and 6.

According to FIGS. 5, 6, and 7, at least one of the two flanges can be made up from at least two flange segments 3a. Shown is a flange segment 3a which is made as a half shell and is provided with two axially running flange edges 3b which, when the flange connection is assembled, are pressed by fastening means diagrammatically shown at 12 against corresponding flange edges 3b of the associated flange segment 3a. The fastening means 12 can again be a bolted connection. Making up a flange from three or four flange segments is also conceivable.

It can be seen from FIGS. 5 and 6 that a thrust ring segment 13 is inserted into the inner circumference of each flange segment 3a, which circumference faces toward the component. This segment is intended to increase the frictional connection between the flange segment 3a and the outer circumferences of the associated components 1 and 2, respectively. The thrust ring segment 13 can be made, for example, of cemented carbide and can be of sawtooth like configuration, as can be seen in FIG. 5. In this case, a positive connection to the outer circumference of the associated component also results.

Figure 8:
FIG. 8 shows an annular disk in cross-section.

According to the invention, in order to avoid damaging the elastomeric ring 6 when the individual flange segments 3a are fastened together, a conical annular disk 14 adapted to the inner contour of the sealing chamber 8, and covering the sealing body 6 and at the end face, can be pushed at least into the sealing chamber 8 of a split flange 3, which annular disk 14 is shown in FIG. 8.

Instead of the thrust ring segment 13 shown in the embodiment of FIGS. 5 and 6, or else in addition thereto, the clamping element 11 shown in FIGS. 2a and 2b can be used together with an associated clamping chamber 10 as previously described.

What is claimed is:

1. A flange connection for two components having a connecting joint such as containers, pipes and the like, comprising:
    (a) flange means comprising a pair of flanges positioned over and being welded to said components, for holding said components axially together at the connecting joint, said flange means having a pair of end faces each defining an annular recess which widens conically in the direction of said connecting joint to thereby form, together with the outside circumference of said components, an annular sealing chamber generally triangular in crosssection,
    (b) a resilient sealing body positioned within said annular sealing chamber and adapted to surround the connecting joint between said components, said resilient sealing body having a substantially semicircular radial cross-section in an undeformed condition and comprising an elastomeric ring which has an inwardly open annular groove and an inner ring which sits loosely in said annular groove, and
    (c) means for fastening said flanges so that a portion of their end faces are contiguous to each other, said flanges when in such fastened position defining said annular sealing chamber, said resilient sealing body being deformed by said fastening to substantially completely fill said sealing chamber thereby sealing the connecting joint.

2. The flange connection as claimed in claim 1, wherein the inner ring has an inner, annular collar which projects between the two components and the two components abut against said annular collar such that the annular collar acts as a stop.

3. The flange connection as claimed in claim 1, wherein the flanges comprise endless profiled material formed into an annular configuration.

4. The flange connection as claimed in claim 1, wherein the sealing body comprises an endless profiled strip formed into an annular configuration.

5. The flange connection as claimed in claim 1, wherein said inner ring sets loosely in a manner to permit working pressure in a medium inside said components to intensify sealing of said elastomeric ring in said sealing chamber.

6. The flange connection as claimed in claim 1, wherein said flanges and seal sealing body comprise endless profiled strips formed into an annular configuration, and wherein said fastening means comprises a separate clamping member fastening said flanges together.

7. The flange connection as claimed in claim 1, wherein said flanges abut one another at the apex of said sealing chamber in the fastened condition.

* * * * *

UNITED STATES PATENT AND TRADEMARK OFFICE
CERTIFICATE OF CORRECTION

PATENT NO. : 4,735,445
DATED : April 5, 1988
INVENTOR(S) : Hans Paul MAIER

It is certified that error appears in the above-identified patent and that said Letters Patent is hereby corrected as shown below:

Cover page, under "FOREIGN PATENT DOCUMENTS", "3206590" should be --3206570--.

Signed and Sealed this

Twenty-fifth Day of July, 1989

Attest:

DONALD J. QUIGG

Attesting Officer

Commissioner of Patents and Trademarks